United States Patent [19]

Ikuta

[11] Patent Number: 5,415,359

[45] Date of Patent: May 16, 1995

[54] FISHING REEL

[76] Inventor: Takeshi Ikuta, 310-go,
City-Park-Kitanoda, 227-2
Takamatsu, Sakai-shi, Osaka, Japan

[21] Appl. No.: 47,561

[22] Filed: Mar. 15, 1993

Related U.S. Application Data

[63] Continuation-in-part of Ser. No. 829,330, Feb. 3, 1992, abandoned.

Foreign Application Priority Data

Feb. 5, 1991 [JP] Japan ................................ 3-3872 U

[51] Int. Cl.$^6$ ............................................. A01K 89/015
[52] U.S. Cl. ....................................... 242/271; 242/319
[58] Field of Search ................. 242/269, 270, 271, 319

[56] References Cited

U.S. PATENT DOCUMENTS

| | | | |
|---|---|---|---|
| 3,478,979 | 11/1969 | Henze | 242/319 |
| 4,651,949 | 3/1987 | Sato | 242/271 |
| 4,742,974 | 5/1988 | Furomoto | 242/271 |
| 4,852,826 | 8/1987 | Sato | 242/270 |

*Primary Examiner*—Katherine Matecki

[57] ABSTRACT

A fishing reel comprising a transmission line mounted within one of side cases for operatively interconnecting a handle and a spool shaft, a friction type drag mechanism mounted between a lateral outer face of the spool and a lateral side face of a mating element opposed to the lateral outer face of the spool to be rotatable in unison with the spool shaft, an engaging member having an engageable element for preventing reverse rotation and connected to the mating element through a connecting portion, and a stopper attached to a reel body and defining an engaged element engageable with the engageable element. The drag mechanism is switchable between an operative position and an inoperative position through relative movement between the spool and the mating element. The mating element and the stopper constitutes an anti-reverse mechanism. The mating element is supported by the other of the side cases, the drag mechanism includes friction surfaces surrounded by an enclosure continuously extending from the spool, the engaging member includes a boss portion having a diameter smaller than that of the engageable element, and the drag mechanism includes a seal disposed between the enclosure and the boss portion for closing a friction operative portion of the drag mechanism.

6 Claims, 6 Drawing Sheets

FISHING REEL

This is a continuation-in-part of U.S. patent application Ser. No. 07/829,330, filed Feb. 3, 1992, now abandoned, the entire disclosure of which is incorporated herein by reference.

BACKGROUND OF THE INVENTION

1. Field of the Invention

The present invention relates to a fishing reel, and more particularly to a fishing reel comprising side cases, a handle supported by one of the side cases for rotating a spool extending between the side cases in a direction for taking up a fishing line, the spool being slidable axially of and rotatable about a spool shaft, a transmission line mounted within one of the side cases for operatively interconnecting the handle and a spool shaft, a transmission line mounted within one of the side cases for operatively interconnecting the handle and the spool shaft, a friction type drag mechanism mounted between a lateral outer face of the spool and a lateral side face of a mating element opposed to the lateral outer face of the spool to be rotatable in unison with the spool shaft, the drag mechanism being switchable between an operative position and an inoperative position through relative movement between the spool and the mating element, and an anti-reverse mechanism including an engageable element connected to the mating element through a connecting portion, and a stopper attached to a reel body and defining an engaged element engageable with the engageable element for preventing reverse rotation.

2. Description of the Related Art

With the conventional reel as described above, one example of which is shown in Japanese Publication No. 50-9718, the mating element (as shown numeral 20 in the same Publication) is opposed to a left side face of the spool forming part of the anti-reverse mechanism. The friction type drag mechanism is mounted between the mating element and the left side face of the spool, and the mating element includes a flange portion horizontally extending from a lateral face of the mating element adjacent the side case. The flange portion defines internal teeth acting as an engaging element in an inner peripheral face thereof. Pawl means engageable with the internal teeth and acting as a stopper is attached to the side case of the reel body. The pawl means and the internal teeth constitute the anti-reverse mechanism.

An enclosure continuously extends from the left side face of the spool for enclosing friction faces of the drag mechanism. The enclosure defines inner peripheral edges that are close to outer peripheral edges of the flange portion.

In the friction type drag mechanism, if dust or seawater enters the friction faces, the drag performance is remarkably deteriorated. In view of this, it is desirable to mount a sealing element between the inner peripheral surface of the enclosure and the outer peripheral surface of the flange portion.

However, the sealing element has a mounting portion larger than the internal teeth acting as the engageable element, which increases the diameter of the sealing portion. As a result, when a contacting force is constant, a sliding resistance becomes large.

During a casting operation, when the drag force is canceled and the spool is rotated relative to the mating element, a large sliding resistance to rotation of the spool is created by the sealing element. This prevents the spool from rotating smoothly and the fishing line from feeding quickly.

SUMMARY OF THE INVENTION

A primary object of the invention is to provide a fishing reel including a sealing element for minimizing rotational resistance applied to the spool to enhance spatial efficiency.

In order to achieve the above-noted object, the fishing reel according to the present invention is characterized in that the mating element is mounted adjacent the other of the side cases, that the stopper is pivotably supported by the other side of the side cases, that an enclosure continuously extends from the spool to surround the friction faces of the drag mechanism, that a boss portion is defined in the engaging member and has a diameter smaller than that of the engageable element, and that a sealing element is disposed in a portion in which the enclosure is opposed to the boss portion for closing a friction force acting space of the drag mechanism.

This structure has the following functions and effects.

The mounting portion of the sealing element is defined in the small boss portion, which reduces the rotational resistance applied to the spool in relative rotation between the spool and the mating element as compared with the conventional structure. The similar sealing effect is obtained even with the boss portion having a small pressing force because of the small diameter. The rotational resistance can be further reduced accordingly.

In addition, the mating element is mounted adjacent the other of the side cases and is separated from the transmission line from the handle to the spool, which facilitates arrangement of the components. In order to condense the arrangement axially of the spool shaft, it is unnecessary to allow the engaging pawl means acting as the stopper to also act as gear teeth for the transmission line.

As a result, the present invention can reduce the restriction of the arrangement, while influences applied to rotation of the spool are restrained.

Other objects, advantages and features will be apparent from the following descriptions referring to the drawings.

BRIEF DESCRIPTION OF THE DRAWINGS

The accompanying drawings illustrate a baitcasting reel according to the present invention, in which.

DETAILED DESCRIPTION OF THE PREFERRED EMBODIMENTS

A drag control structure for a baitcasting reel according to the present invention will be described in detail hereinafter referring to the drawings.

Figure 1:
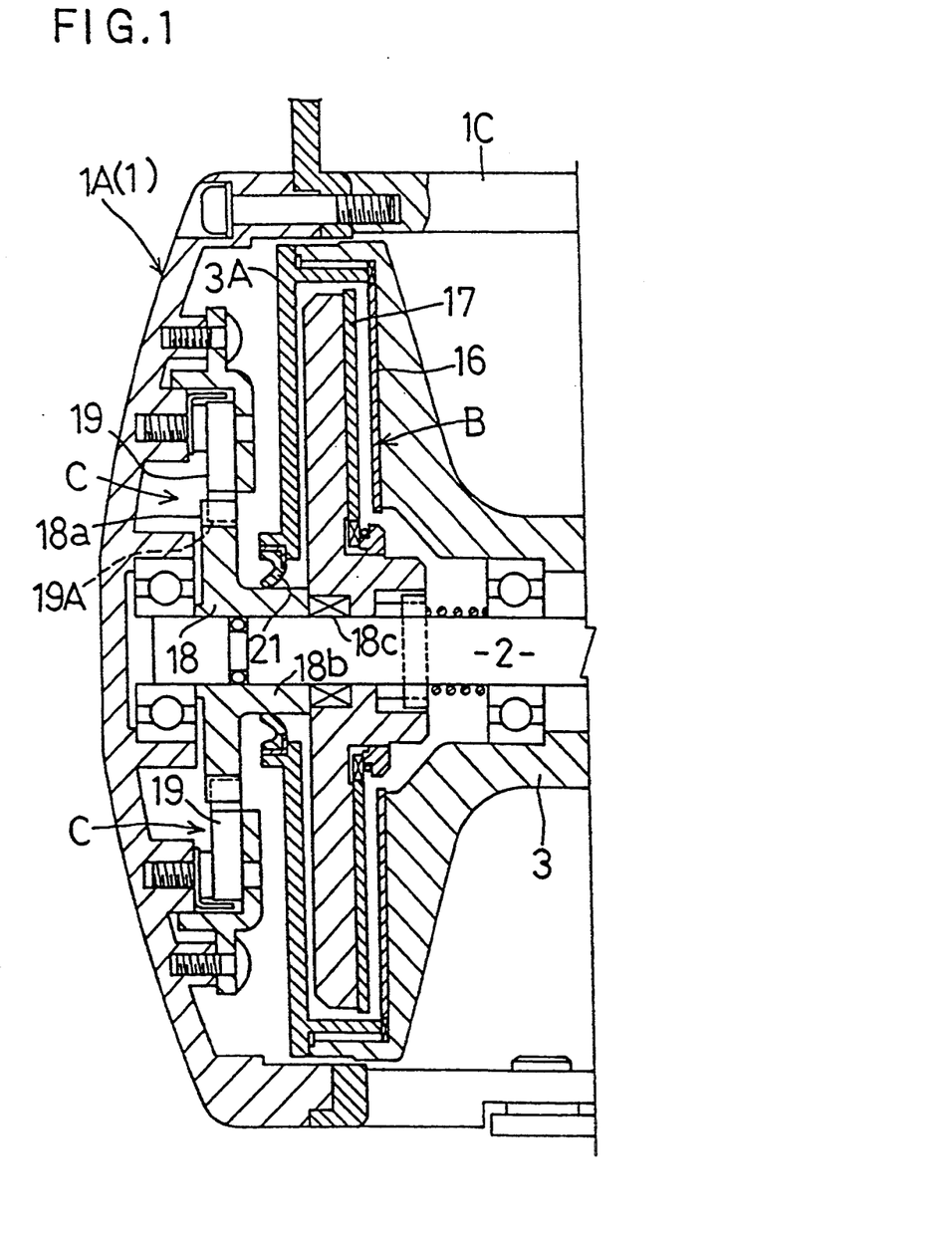
FIG. 1 is a sectional view of a left side case of the reel revealing an internal structure thereof.
Figure 2:
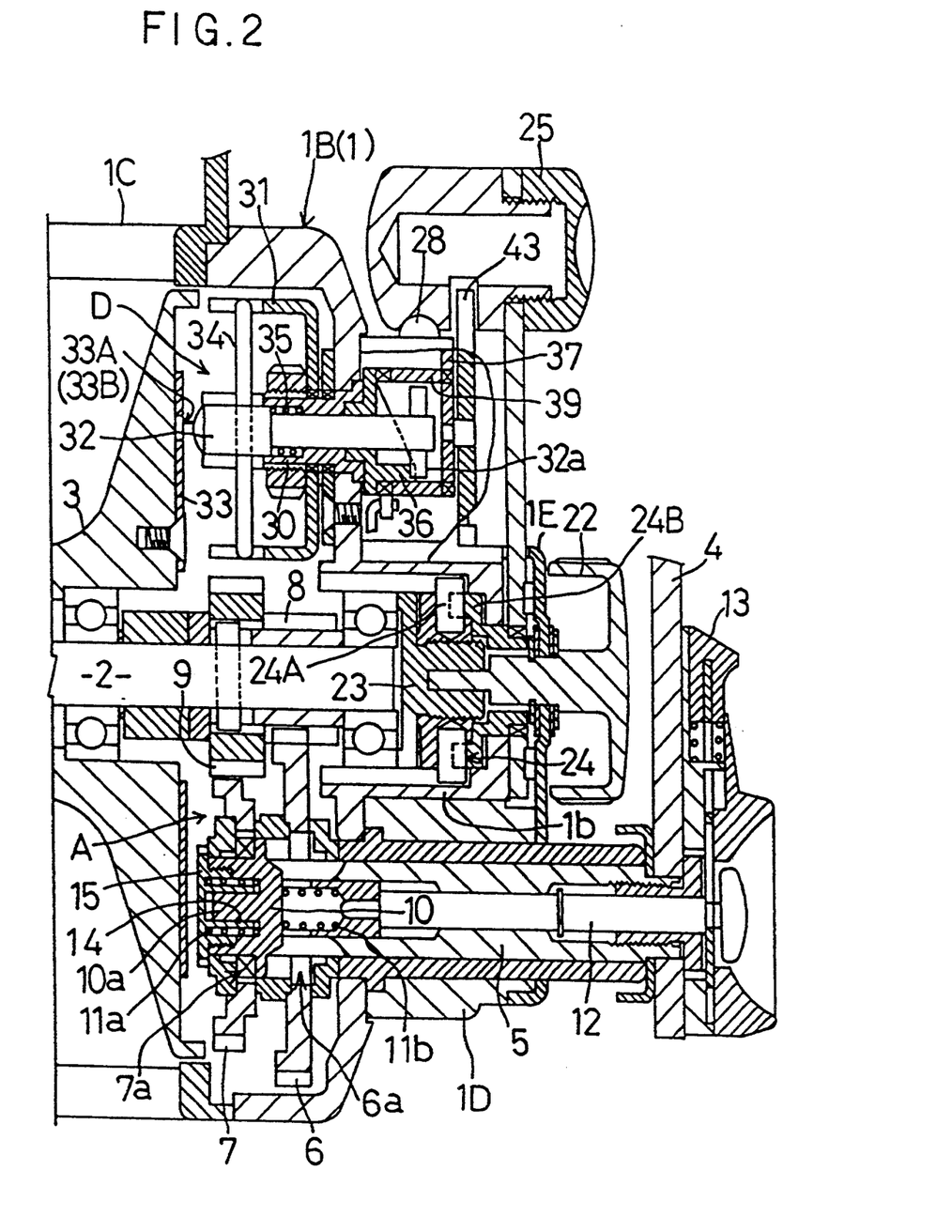
FIG. 2 is a sectional view of a right side case of the reel revealing an internal structure thereof.

FIGS. 1 and 2 show a baitcasting reel comprising a body 1, a spool shaft 2 horizontally mounted in the reel body, and a spool 3 rotatably supported by the spool shaft 2 for taking up a fishing line. The reel further comprises a handle 4, a sleeve shaft 5 connected to the handle 4, a speed change gear mechanism A, and a drag mechanism B. Drive from the sleeve shaft 5 is transmitted to the spool 3 through the speed change gear mechanism A and the drag mechanism B. These components constitute a winding-up transmission line.

The reel body 1 includes right and left side cases 1A and 1B, a cross frame 1C interconnecting the side cases 1A and 1B, and a handle supporting case D mounted on the right side case 1B. Each of those elements 1A, 1B, 1C and 1D is formed by forging and cutting or die-casting aluminum.

Referring to FIG. 2, the speed change gear mechanism A includes a first gear 6 for taking up the fishing line at high speed and a second gear 7 for taking up the fishing line at low speed, which gears are rotatably supported by the sleeve shaft 5, a third gear 8, a fourth gear 9 rotatable in unison with the spool shaft 2 and meshed with the first and second gears 6 and 7, respectively, an engaging element 10 slidably supported by the sleeve shaft 5 to be engageable into engaged bores 6a and 7a defined in the first and second gears 6 and 7 for transmitting the drive from the sleeve shaft 5 to either one of the first and second gears 6 and 7, inner and outer compression springs 11a and 11b for positioning the engaging element 10, and a control shaft 12 for determining the position of the engaging element 10. With this speed change gear mechanism A, the engaging element 10 is engaged into the engaged bore 6a defined in the first gear 6 under an urging force of the inner compression spring 11a when the control shaft 12 is pushed out. When the control shaft 12 is pushed in as shown in FIG. 2, the inner compression spring 11a is compressed and the engaging element 10 is engaged into the engaged bore 7a defined in the second gear 7 under an urging force of the outer compression spring 11b.

The control shaft 12 defines a groove in an outward end region thereof for engaging a slidable stopper 13 attached to the handle 4. When the control shaft 12 is pushed in, the stopper 13 engages the control shaft 12 and maintains it in that position. If the engaging element 10 and the engaged bore 7a of the second gear 7 are not in phase with each other, the engaging element 10 is maintained in contact with a side face of the second gear 7. When the handle 4 is rotated thereafter to move the engaging element 10 into phase with the engaged bore 7a, the engagement therebetween is completed under the urging force of the outer compression spring 11b.

With this speed change gear mechanism A, the engaging element 10, guided by a slit defined in the sleeve shaft 5, is prevented from inclining in a plane perpendicular to an axis of the sleeve shaft 5, i.e. inclining in a direction of rotation, through contact with inner walls of the slit. However, the engaging element 10 tends to incline in a plane along the axis of the sleeve shaft 5. In order to prevent this inclination, the engaging element 10 includes a projection 10a extending through the sleeve shaft 5 toward an inward end of the sleeve shaft 5. A tubular position retaining element 14 is provided for slidably contacting the projection 10a to prevent the inclination of the engaging element 10 when the engaging element 10 is operated toward the inward end of the sleeve shaft 5.

The position retaining element 14 is integrally formed with a spring bearing 15 screwed to the inward end of the sleeve shaft 5.

The drag mechanism B will be described next.

Referring to FIG. 1, the drag mechanism B is mounted adjacent the left side case 1A opposite to the right side case 1B supporting the handle 4. The spool 3 is rotatable about and slidable along an axis of the spool shaft 2. A friction plate 16 is disposed on a lateral outer face of the spool 3, while a mating element 17 having a friction surface is opposed to the friction plate 16. The mating element 17 is rotatable in unison with the spool shaft 2 and movable along the axis of the spool shaft 2. As shown, the drag mechanism B allows the spool 3 to move along with the spool shaft 2 from an inoperative position spaced apart from the mating element 17 to an operative position in which the friction plate 16 acts on the friction surface of the mating element 17.

A control structure for the drag mechanism B will be set forth below.

Referring back to FIG. 2, a preset knob 22 is attached to a plate 1E and to the right side case 1B at a position of the axis of the spool shaft 2 through the handle supporting case 1D to be only rotatable. At an inward end portion of the preset knob 22 are mounted an intermediate transmission element 23 and a movable cam element 24A screwed to the intermediate transmission element 23 to allow screw feed of the intermediate transmission element 23. The movable cam element 24A is also movable axially of the spool shaft 2 along with the intermediate transmission element 23. The intermediate transmission element 23 is attached to the preset knob 22 to be rotatable in unison therewith and movable axially of the spool shaft 2 relative to the preset knob 22 and the movable cam element 24A through a cam mechanism 24 as described in detail later.

The intermediate transmission element 23 mounted for screw feeding in the movable cam element 24A forming part of the cam mechanism 24. The movable cam element 24A is attached to a boss portion 1b of the right side case 1B to be relatively slidable through a slit only axially of the spool shaft 2. A rotary cam element 24B facing the movable cam element 24A is relatively rotatably disposed on an inner surface of the boss portion 1b. At an outer end portion of the rotary cam element 24B is mounted a drag control element 25 rotatable in unison therewith.

The cam mechanism 24 is mounted on a contact portion between the rotary cam element 24B and the movable cam element 24A. When the drag control element 25 is rotated about the spool shaft 2, the movable cam element 24A and the intermediate transmission element 23 are moved together axially of the spool shaft 2 by the action of the cam mechanism 24.

As set forth above, the preset knob 22 can move only the intermediate transmission element 23 to initially determine a drag force, while the drag control element 25 can move the movable cam element 24A and the intermediate transmission element 23 together to increase or decrease the drag force from the initial setting.

Figure 4:
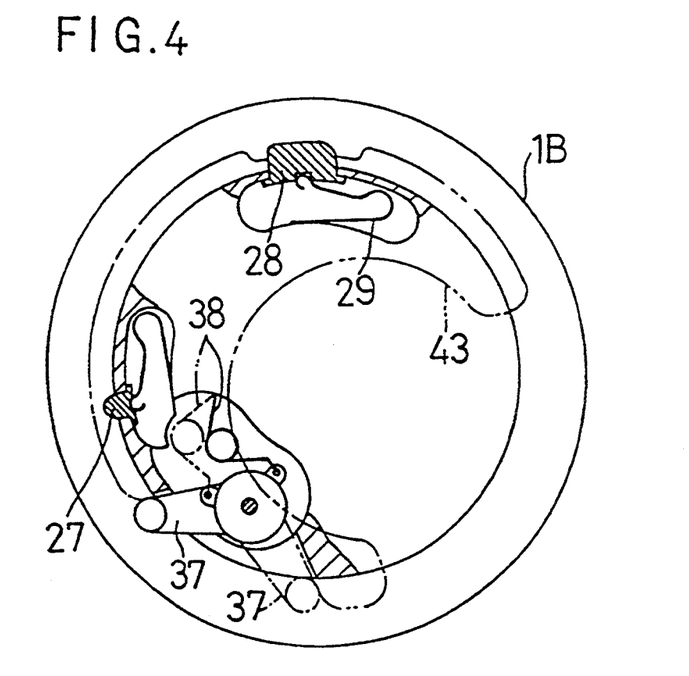
FIG. 4 is a partially broken-away side view showing stoppers.
Figure 5:
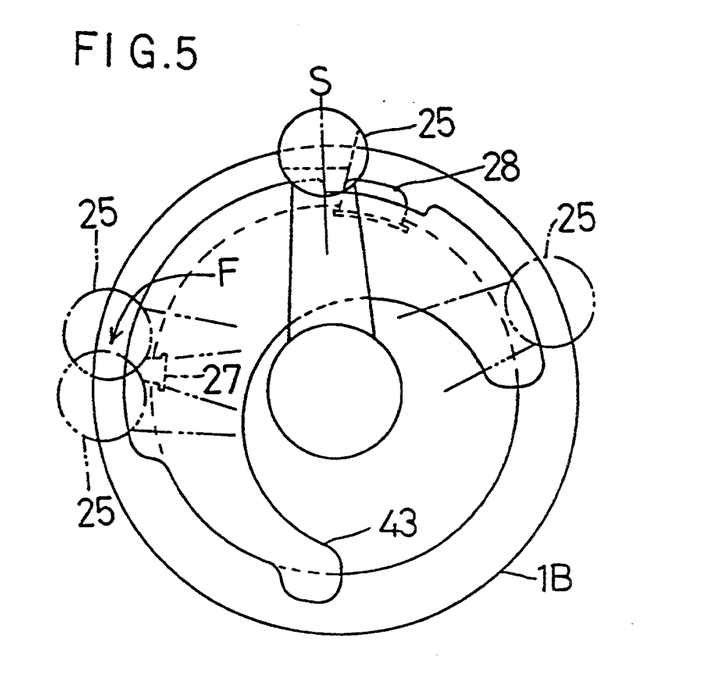
FIG. 5 is a side view showing a positional relationship between the stoppers and a drag control element.

Referring now to FIGS. 4 and 5, a first stopper 27 is urged to project outwardly in an illustrated F position within an operative area of the drag control element 25. The drag control element 25 receives a resistance at a position of the first stopper 27 in which the drag force is minimum, thereby to inform the operator that the drag control element 25 has reached the F position. When the drag control element 25 is required to move to an inoperative area, the first stopper 17 is forcibly depressed to allow movement of the drag control element 25. A second stopper 28 is provided at a strike position S for contacting the drag control element 25 moved in a direction to increase the drag force. The second stopper 28 is switchable between a contacting position to which the stopper 28 is urged by an urging spring 29, and a rest position to which the stopper is retracted from a moving area of the drag control element 25 through a manual operation by the angler. A head of the second stopper 28 is radially pressed in along a side face of the right side case 1B, thereby to allow the drag control element 25 to be moved to a stronger drag area.

As mentioned above, the second stopper 28 is urged by the spring 29 to project and is pressed in along the side face of the right side case 1B. Even in the projecting position, the head of the second stopper 28 does not lie outwardly of an outer peripheral edge of the right side case 1B. This construction effectively protects the second stopper 18 per se from damage resulting from the head of the stopper 18 being caught by the angler. For returning from the stronger drag area to the normal drag area, the drag control element 25 is simply moved in the corresponding direction. The second stopper 28 is then depressed to the rest position by the drag control element 25. The second stopper 28 automatically returns to the contacting position after passage of the drag control element 25. Numeral 43 denotes a guide plate for the drag control element 25.

A mechanism D for producing a sound when the spool is rotated will be described hereinafter.

As shown in FIG. 2, a rotary supporting boss 30 is mounted within the right side case 1B. A sound ring 31 is screwed on the rotary supporting boss 30 for producing the sound and a swing pin 32 acting as an intermediate transmission member is supported within the rotary supporting boss 30 to be reciprocable axially of the spool shaft 2.

Figure 6:
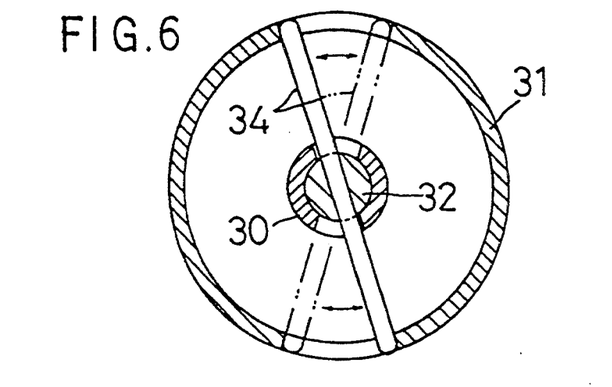
FIG. 6 is a vertical section view of a swing pin and a striking rod.
Figure 7:
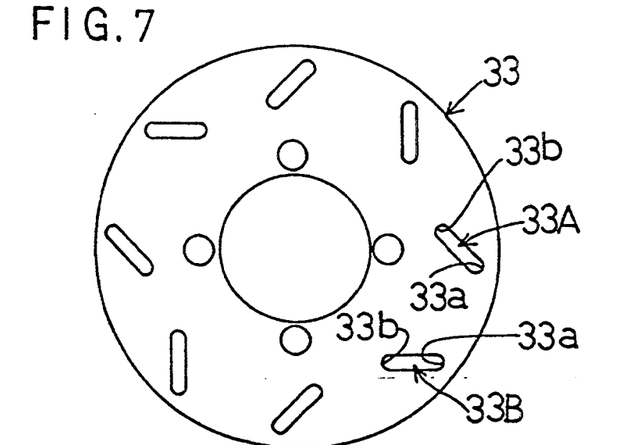
FIG. 7 is a side view of a rotary disk.
Figure 8:
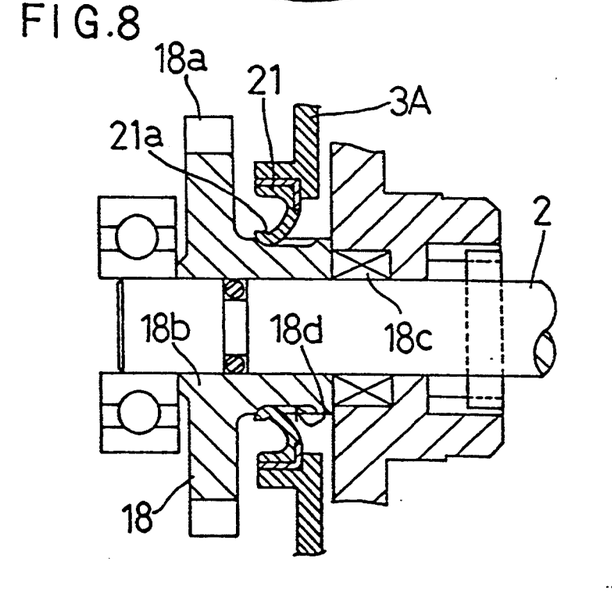
FIG. 8 is a section view showing a stopper according to another embodiment.

Referring to FIG. 7, a rotary disk 33 is attached to a lateral face of the spool 3 facing the swing pin 32 to contact an extreme end of the swing pin 32. Snapping bores 33A acting as engaging portions are defined in the rotary disk 33 to engage and snap the swing pin 32. The swing pin 32 carries a striking rod 34 for colliding at opposite ends thereof with engaging grooves defined in the sound ring 31 to produce a clicking sound. As shown in FIG. 7, each snapping bore 33A has longitudinal sides inclined by a predetermined angle with respect to a radial direction, i.e. one end 33a of the snapping bore 33A which acts as a first engaging portion is displaced toward the center of rotation with reference to the other end 33b. Thus, the swing pin 32 receives a radially moving force from the time of engagement with the snapping bore 33A till it disengages therefrom. Meanwhile, the pin 32 receives a circumferential moving force, resulting in a torque acting about an axis of the pin. Then, the striking rod 34 strikes the sound ring 31. An adjacent snapping bore 33B acting as a second engaging portion is inclined in an opposite direction to apply a rotational force in the opposite direction to the swing pin 32, whereby the striking rod 34 strikes the sound ring 31. Thus, as shown in FIG. 6, the striking rod 34 is repeatedly switchable between the position shown in solid lines and the position shown in two-dot-chain lines to generate clear sounds.

A spring 35 is mounted between the swing pin 32 and the rotary supporting boss 30 for urging and projecting the swing pin 32. At an outer end portion of the rotary supporting boss 30 is mounted a rotary cam 36 having an outer cam face to contact a rear end pin 32a of the pin 32 to restrict projection of the swing pin 32. A drive frame 39 and a changeover lever 37 are provided for engaging and rotating the rotary cam 36. The changeover lever 37 is turnable in opposite directions to retract and extend the swing pin 32 to be switchable between a sound producing position and a non-sound producing position. Numeral 38 in FIG. 4 denotes a toggle spring for maintaining the swing pin 32 in the two alternative positions.

Figure 3:
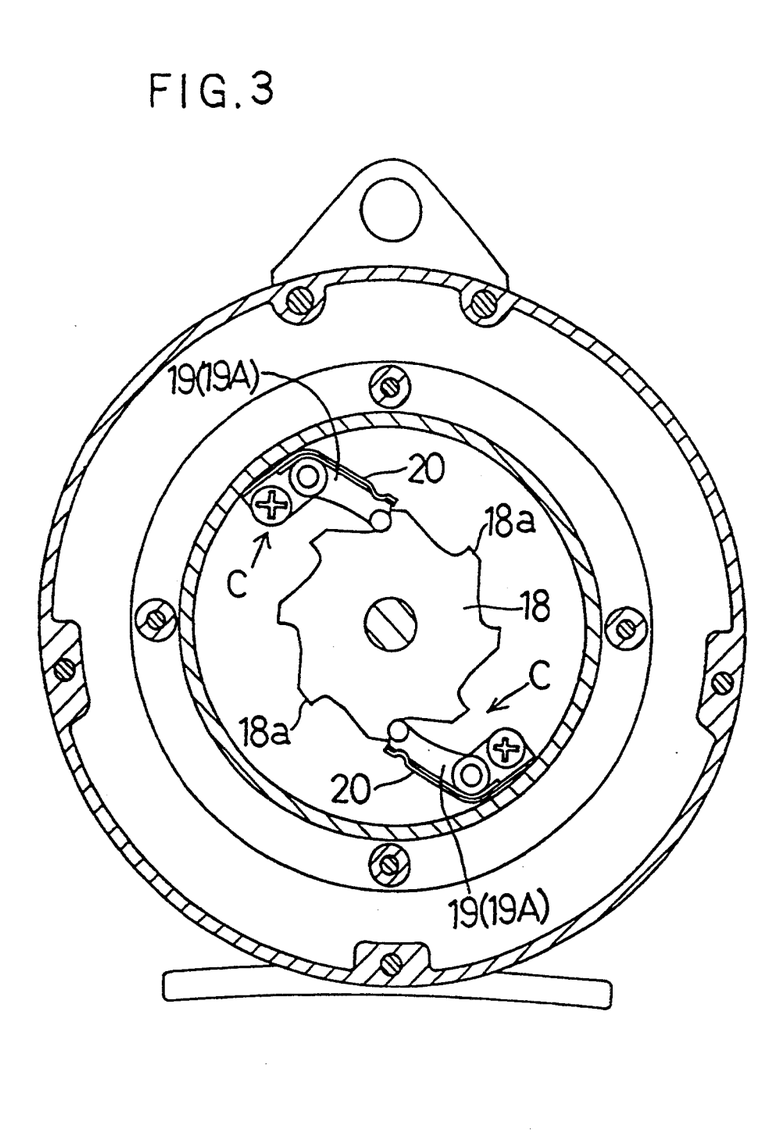
FIG. 3 is a side view of an anti-reverse mechanism.

As shown in FIG. 1, a ratchet wheel 18 acting as a connecting element is rigidly connected to the mating element 17 through a connecting portion 18c adjacent the left side case 1A, while ratchet pawls 19 are pivotably supported by inner peripheries of the left side case 1A to be engageable with outer circumferential teeth 18a acting as a connecting element of the ratchet wheel 18. Referring to FIG. 3, each ratchet pawl 19 defines an extreme hook portion 19A acting as an engaged element engageable with the teeth 18a of the ratchet wheel 18 and receiving an engaging force from a blade spring 20. The ratchet wheel 18 and the ratchet pawls 19 together constitute an anti-reverse mechanism C for locking the spool 3 against rotation in a fishing line feeding direction of the spool 3.

As shown in FIG. 1, a cover member 3A extends from an end of the spool 3 for surrounding the friction faces of the drag mechanism B. The cover member 3A receives a boss portion 18b of the ratchet wheel 18 in an inner periphery thereof. An annular lip seal 21 is disposed between the inner periphery of the cover member 3A and an outer periphery of the boss portion 18b. The ratchet wheel 18 with the outer peripheral teeth allows an outer diameter of the boss portion 18b carrying the annular seal 21 with a simple structure to be reduced to the extent that the boss portion 18 can withstand shocks received from the ratchet pawls 19. The reduced outer diameter of the boss portion 18b is smaller than that of the outer teeth 18a of the ratchet wheel 18, which can reduce a rotational resistance applied to free rotation of the spool 3 by the annular seal 21, and at the same time enhance a reliable waterproof effect. The annular seal 21 can also define a small seal lip contacting the boss portion 18b, which can dispense with any mechanism for canceling the contact between the seal lip and the boss portion 18b at the time of free rotation of the spool.

Figure 9:
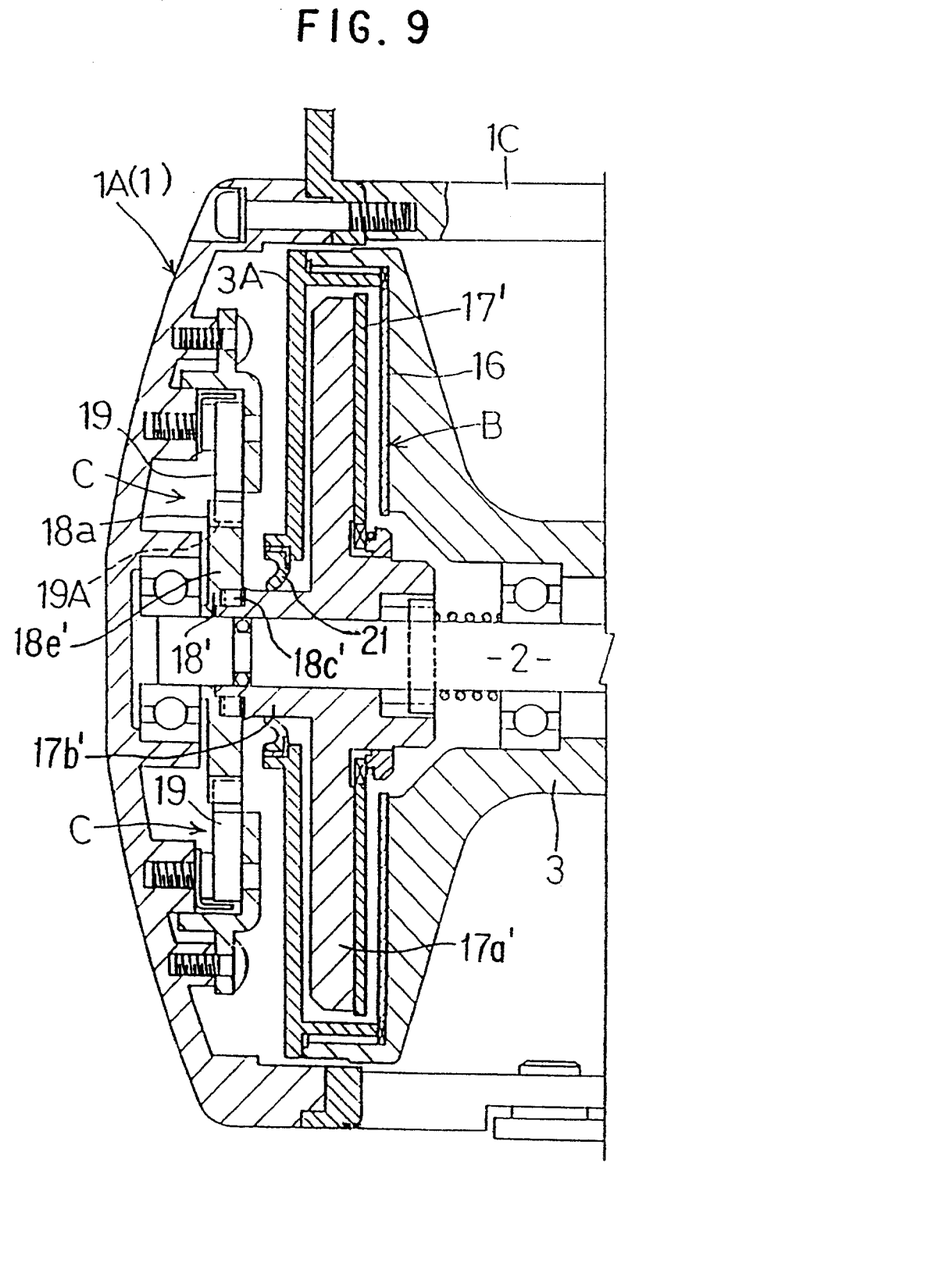
FIG. 9 is a sectional view like FIG. 1, but revealing an internal structure for an alternative embodiment of the invention.

In the alternative embodiment illustrated in FIG. 9, the ratchet wheel 18' includes a disk-shaped main portion 18e' and an integral connecting portion 18c'. The connecting portion 18c' is essentially identical in structure and function to the connecting portion 18c shown in FIG. 1. The ratchet teeth 18a are located on the outer periphery of the main portion 18e'. The mating element 17' includes a disk-shaped main portion 17a' and an elongated cylindrical boss portion 17b'. The main portion 17a' and the boss portion 17b' are integral with each other such that the boss portion 17b' is rigidly non-movable with respect to the main portion 17a' of the mating element 17'. The boss portion 17b' is connected to the connecting portion 18c' such that the ratchet wheel 18' is non-rotatable with respect to the mating element 17'. The embodiment illustrated in FIG. 9 is otherwise identical to the embodiment illustrated in FIG. 1.

Other embodiments will be listed below.

(1) The mating element 17 (and 17') may be modified to have selectively any shapes other than the disk shape, only if it includes friction surfaces for producing the drag force.

(2) O-rings or oil seals may be used as the annular seal 21.

(3) The boss portion 18b (and 17b') may define a circumferential groove 18d in an outer peripheral face thereof. A turned lip 21a of the seal 21 may be inserted into the groove to splash entering water under a rotational force thereof.

What is claimed is:

1. A fishing reel comprising:
   a reel body with side cases;
   a spool located between said side cases, and a spool shaft, said spool being slidable axially of and rotatable about a spool shaft;
   a handle supported by one of said side cases for rotating said spool in a direction for taking up a fishing line;
   a transmission mounted within one of said side cases for transmitting rotation between said handle and said spool shaft;
   a mating element opposed to a lateral outer face of said spool to be rotatable in unison with said spool shaft;
   a friction drag mechanism mounted between said lateral outer face of said spool and a lateral side face of said mating element, said mechanism including means for switching between an operative position and an inoperative position through relative movement between said spool and said mating element;
   an engaging member rotatable in unison with said spool shaft and having an engageable element for preventing reverse rotation; and
   a stopper attached to said reel body and defining an engaged element engageable with said engageable element; said mating element and said stopper constituting an anti-reverse mechanism; and
   wherein said mating element is supported by the other of said side cases;
   wherein said drag mechanism includes friction surfaces surrounded by an enclosure continuously extending from said spool, said enclosure having an opening;
   wherein one of said engaging member and said mating element includes a boss portion having a diameter smaller than that of said engageable element and extending through said opening in said enclosure; and
   wherein said drag mechanism includes a seal disposed between said enclosure and said boss portion for closing a friction operative portion of said drag mechanism.

2. A fishing reel as claimed in claim 1, wherein said mating element is disk-shaped.

3. A fishing reel as claimed in claim 2, wherein said engaging member comprises a ratchet wheel, said engageable element comprises outer teeth of said ratchet wheel, said stopper comprises ratchet pawls, said ratchet wheel is rigidly connected to said mating element through a connecting portion, said ratchet pawls being engageable with said outer teeth and being pivotably supported in an inner peripheral surface of said side case.

4. A fishing reel as claimed in claim 1, wherein said boss portion defines an annular groove in an outer peripheral surface thereof, said seal having a turned lip inserted into said annular groove.

5. A fishing reel as claimed in claim 1, wherein said mating element includes a disk-shaped main portion, said boss portion being integral with said main portion of said mating element.

6. A fishing reel comprising:
   side cases;
   a handle supported by one of said side cases for rotating a spool extending between said side cases in a direction for taking up a fishing line, said spool being slidable axially of and rotatable about a spool shaft;
   a transmission mounted within one of the side cases for transmitting rotation between said handle and said spool shaft;
   a mating element opposed to a lateral outer face of said spool to be rotatable in unison with said spool shaft;
   a friction drag mechanism mounted between said lateral outer face of the spool and a lateral side face of the mating element, said mechanism including means for switching between an operative position and an inoperative position through relative movement between the spool and the mating element;
   an engaging member rotatable in unison with said spool shaft and having an engageable element for preventing reverse rotation; and
   a stopper attached to a reel body and defining an engaged element engageable with said engageable element; said mating element and said stopper constituting an anti-reverse mechanism; and
   wherein said mating element is supported by the other of the side cases;
   wherein said drag mechanism includes friction surfaces surrounded by an enclosure continuously extending from said spool;
   wherein said engaging member includes a boss portion having a diameter smaller than that of said engageable element and extending through an opening in said enclosure; and
   wherein said drag mechanism includes a seal disposed between said enclosure and said boss portion for closing a friction operative portion of the drag mechanism.

* * * * *